United States Patent
Hutter et al.

(10) Patent No.: US 11,732,427 B2
(45) Date of Patent: Aug. 22, 2023

(54) HOLDER FOR FIXING A SPRAY CAN

(71) Applicant: SWOZI AG, Diepoldsau (CH)

(72) Inventors: Mario Hutter, Berneck (CH); Peter James Roberts, Wynnum (AU)

(73) Assignee: Swozi AG, Diepoldsau (CH)

( * ) Notice: Subject to any disclaimer, the term of this patent is extended or adjusted under 35 U.S.C. 154(b) by 585 days.

(21) Appl. No.: 16/500,907

(22) PCT Filed: Feb. 16, 2018

(86) PCT No.: PCT/EP2018/053880
§ 371 (c)(1),
(2) Date: Oct. 4, 2019

(87) PCT Pub. No.: WO2018/184759
PCT Pub. Date: Oct. 11, 2018

(65) Prior Publication Data
US 2020/0123718 A1   Apr. 23, 2020

(30) Foreign Application Priority Data
Apr. 5, 2017   (EP) .................................... 17164925

(51) Int. Cl.
*E01C 23/22* (2006.01)
*E01C 23/16* (2006.01)
*G01C 15/04* (2006.01)

(52) U.S. Cl.
CPC ............ *E01C 23/163* (2013.01); *E01C 23/22* (2013.01); *G01C 15/04* (2013.01)

(58) Field of Classification Search
CPC ...... E01C 23/163; E01C 23/22; E01C 23/227; G01C 15/04
See application file for complete search history.

(56) References Cited

U.S. PATENT DOCUMENTS 4,262,821 A * 4/1981 Smrt .................... B65D 83/203
118/305
4,599,968 A * 7/1986 Ryder .................. B65D 83/267
239/722

(Continued)

FOREIGN PATENT DOCUMENTS

| CH | 695 087 A5 | 12/2005 |
| DE | 24 36 887 | * 2/1975 |
| WO | WO 2880/047205 A2 | * 4/2008 |

OTHER PUBLICATIONS

International Search Report Corresponding to PCT/EP2018/053880 dated Jul. 26, 2018.

(Continued)

*Primary Examiner* — Gary S Hartmann
(74) *Attorney, Agent, or Firm* — Finch & Maloney PLLC

(57) ABSTRACT

A holder (1) for fixing a cylindrical spray can (2). The holder (1) comprises a holding unit (3) for fixing the spray can (2) with a first mechanical interface (4) for connecting a GNSS receiver (5) or prism to the holding unit (3). The holding unit (3) is adapted to hold the spray can (2) such that the GNSS receiver (5) or prism and the spray can (2) are arranged coaxially to each other. The holding unit (3) comprises a second mechanical interface (6) for releasably connecting the holder (1) to a frame (7) of a surveying cart (8).

16 Claims, 4 Drawing Sheets

(56) References Cited

U.S. PATENT DOCUMENTS

| | | | | |
|---|---|---|---|---|
| 6,062,443 | A * | 5/2000 | Smrt | B65D 83/203 |
| | | | | 222/608 |
| 6,064,940 | A | 5/2000 | Rodgers et al. | |
| 6,074,693 | A | 6/2000 | Manning | |
| 7,419,104 | B2 * | 9/2008 | Roman | E01C 23/227 |
| | | | | 118/305 |
| 8,938,366 | B2 * | 1/2015 | Nielsen | B65D 83/203 |
| | | | | 702/130 |
| 9,086,277 | B2 * | 7/2015 | Nielsen | G01C 15/02 |
| 9,833,688 | B2 * | 12/2017 | McGuffie | A63C 19/065 |
| 9,968,953 | B2 * | 5/2018 | Allega | B05B 12/124 |
| 11,369,861 | B2 * | 6/2022 | McGuffie | A63C 19/065 |
| 2003/0168834 | A1 * | 9/2003 | Ulrich | G05D 1/0278 |
| | | | | 280/727 |
| 2010/0272885 | A1 | 10/2010 | Olsson et al. | |
| 2013/0310971 | A1 * | 11/2013 | Prouty | E01C 23/163 |
| | | | | 901/1 |
| 2015/0362316 | A1 * | 12/2015 | Kohn | G01C 15/04 |
| | | | | 427/137 |
| 2019/0038960 | A1 * | 2/2019 | Roberts | B05B 12/12 |

OTHER PUBLICATIONS

Written Opinion Corresponding to PCT/EP2018/053880 dated Jul. 26, 2018.

* cited by examiner

HOLDER FOR FIXING A SPRAY CAN

BACKGROUND

The present invention relates to a holder, a surveying cart, a set including a surveying cart and a spray can and a method for surveying according to the preamble of the independent claims.

Sports fields typically consist of a set of straight or curved lines and points. The lines are drawn with line markers. Line markers are pushed along a string which is tensioned between two end points of the line. These end points must be found in a surveying process. A surveying device typically used therein comprises a GNSS (global navigation satellite system) receiver attacked to one end of a pole. The other end of the pole is typically sharpened such that the pole may be put into the soil of the sports field. The GNSS sensor detects a current location. This location is displayed on a display device, which is carried along independently. When a desired location is reached the location is marked with the sharpened end. Additionally the desired location may be marked with a spray can. This method requires a surveyor to handle (a) the surveying pole, (b) the display device and (c) the spray can independently at the same time. Furthermore, the marked location by the sharpened end or the spray can only corresponds to the detected location by the GNSS sensor, if the pole is in a perfectly upright position.

U.S. Pat. No. 6,064,940 shows a plotter and a method for laying out computerized construction plans on a construction site. The plotter includes a mobile applicator carrying a locator. The locator may be a global positioning system to determine the current location of the applicator. Furthermore, the mobile applicator includes a landscape spray paint can with a removed nozzle. Both the global positioning system and the spray can are mounted on the applicator and can be pushed by the user with a holding handle.

U.S. Pat. No. 6,074,693 discloses a global positioning system controlled paint spray system. The system is mounted on a manual push carrier and includes nozzles which are attached to the carrier via positioning arms. The positioning arms can be moved with a controller along a cross track direction. The system includes a plurality of components and is thus complex and expensive.

CH 695 087 discloses a mobile device including at least one wheel and a frame. A marking can and a satellite positing system are arranged coaxially with each other.

It is the problem of the invention to overcome the disadvantages of the prior art. In particular, it is the problem of the invention to provide an easy, reliable, and inexpensive method and device for surveying.

SUMMARY OF THE INVENTION

The invention is a holder for fixing a cylindrical spray can. The holder comprises a holding unit for fixing the spray can. The holding unit comprises a first mechanical interface for connecting a GNSS receiver or prism to the holding unit. The holder further preferably comprises a GNSS receiver or prism attached to the first mechanical interface of the holding unit. The holding unit is adapted to hold the spray can such that the first mechanical interface and/or the GNSS receiver or prism and the spray can are arranged coaxially with each other. The holding unit comprises a second mechanical interface for releasably connecting the holder to a frame of a surveying cart.

Thereby, any cart can be provided with such a holder as an accessory. Thus, existing carts can be equipped with a GNSS receiver or prism. Furthermore a detected GNSS location is identical to a location marked with the spray can, since the spray can and the GNSS receiver or prism and/or the first mechanical interface are arranged coaxially.

The second mechanical interface may comprise an adapter or may be a spray can on which the holder is fixed. The first mechanical interface preferably is a thread, more preferably a thread on a metal plate. Using a thread enables fixing the GNSS receiver in an easy way. The first mechanical interface is preferably arranged in a way to fix a spray can as close as possible under the GNSS receiver when in use to reduce any position errors.

In a preferred embodiment, the holding unit comprises one or two or three or four or more spring elements for holding the spray can. Particularly preferred, the spring elements are elongated. Thereby, a spray can be held securely while at the same time the spray can is quickly removable. The spring force of each of the spring elements is preferably equal for every spring element.

In a preferred embodiment, two or more spring elements are arranged circumferentially around the spray can. Thereby, a grip of the spring elements is improved.

In a preferred embodiment, the holding unit comprises of a cap, preferably a circular cover plate, and a bottom, preferably a ring, which are preferably arranged coaxially and are connected by rods. The rods are preferably parallel to the vertical axis of the holding unit and/or the spray can and/or the GNSS receiver. Thereby, a spray can is visible from the outside and a secure attachment of the spray can may be verified by the user.

In a preferred embodiment, the GNSS receiver or prism comprises a data interface, particularly preferred a wireless data interface. Thereby, detected positions can be transmitted to a second device, where they may be displayed.

In a preferred embodiment, the GNSS receiver is a real time kinematic (RTK) GNSS receiver. Thereby, a position of the receiver can be tracked precisely and in real time on a second device.

In a preferred embodiment, the holder comprises a pointer for indicating a projection of the vertical axis of the GNSS receiver on the ground to a user. Preferably, the pointer is a wire. Alternatively, the pointer may be a light pointer, preferably a laser pointer, fixed to the holder. Thereby, a user can see the precise geolocation of the GNSS receiver on the ground.

A nozzle of the spray can may be arranged such that marking material is dispensed in the direction of the vertical axis. The pointer then allows a user to see where the spray can is going to mark the ground.

It is further suggested to provide a surveying cart comprising a frame, wherein at least three wheels and a first holder according to the invention are attached to the frame. The first holder is releasably connected to the frame with the second mechanical interface. Particularly preferred, the cart comprises four or more wheels. Thereby, the cart may be pushed without tilting the vertical axis of the spray can and the GNSS receiver and prism. Thus, a detected location always corresponds to a surveyed position which may be marked.

The second mechanical interface may be an adapter or a spray can.

The GNSS receiver may comprise an interface, preferably a wireless interface, to transmit data, especially data regarding a GNSS position, to a data storing device or a computing unit.

In a preferred embodiment, the surveying cart comprises a computing unit adapted to receive and store a detected location in an electronic storage and preferably a data interface which is connectable to the data interface of the GNSS receiver. Thereby, surveyed points may be saved for a later use.

In a preferred embodiment, the surveying cart comprises a display device for displaying one or more or all of: a current position of the GNSS receiver, stored positions, a predetermined pattern, steering information and a location and wrong direction error. Thereby, the user can be informed which points still need to be surveyed, where they are, how far the points are away and/or provide direction to those surveying points.

In a preferred embodiment, the holder is mounted as a pendulum to the cart. Thereby, a GNSS position can be marked more precisely, since the spot marked on the ground is independent of an inclination of the ground.

In a preferred embodiment, the cart comprises a second holder for holding at least one additional spray can. Thereby, the cart can carry reserve spray cans, which can be exchanged, if the spray can currently mounted in the first holder is empty.

It is further suggested to provide a set including a holder and a spray can.

It is further suggested to provide a set including a surveying cart and a spray can. The spray can is held by the first holder. Preferably, the spray can is held by the spring elements of the first holder. The spray can preferably comprises a circular cylindrical shell surface.

In a preferred embodiment, the spray can includes a nozzle. The nozzle is preferably arranged such that it is observable by a user. Thereby, a user can verify whether the ground was marked.

In a preferred embodiment, the nozzle is arranged to dispense material in the direction of the vertical axis of the GNSS receiver and the spray can. Thereby a detected GNSS position and a marked location are identical.

In a preferred embodiment, the spray can is arranged in front of the second holder and behind the first holder along an intended direction of movement. In between the first and second holder a gap is formed such that the nozzle is observably by user. Alternatively the first holder with the spray can may be mounted on a side of the frame.

The surveying cart can further comprise a mechanism for activating the spray can, preferably a handle. The handle is preferably actuatable by the user in an upright position of the user. Preferably, this mechanism is attached to a pushing handle and connected to the spray can to activate spraying.

It is further suggested to provide a method for surveying. In particular, it is suggested to provide a method for surveying a sports field. The method is carried out with a surveying cart according to the invention or a set according to the invention and includes the steps:
Moving the cart to a location;
Detecting the current location of the GNSS receiver or prism;
Saving the detected location to a storage.

In a preferred embodiment, the method further includes the step of marking the current location with a spray can.

In a preferred embodiment, the method further includes the steps:
Comparing the detected position to a predetermined location with a comparator;
Calculating a location and direction error with a comparator;
Providing steering information including the location and/or direction error to an operator of the cart, preferably with a display.

BRIEF DESCRIPTION OF THE DRAWINGS

Non-limiting embodiments of the invention are described by way of example only with respect to the accompanying drawings, in which.

DETAILED DESCRIPTION OF THE PREFERRED EMBODIMENTS

Figure 1:
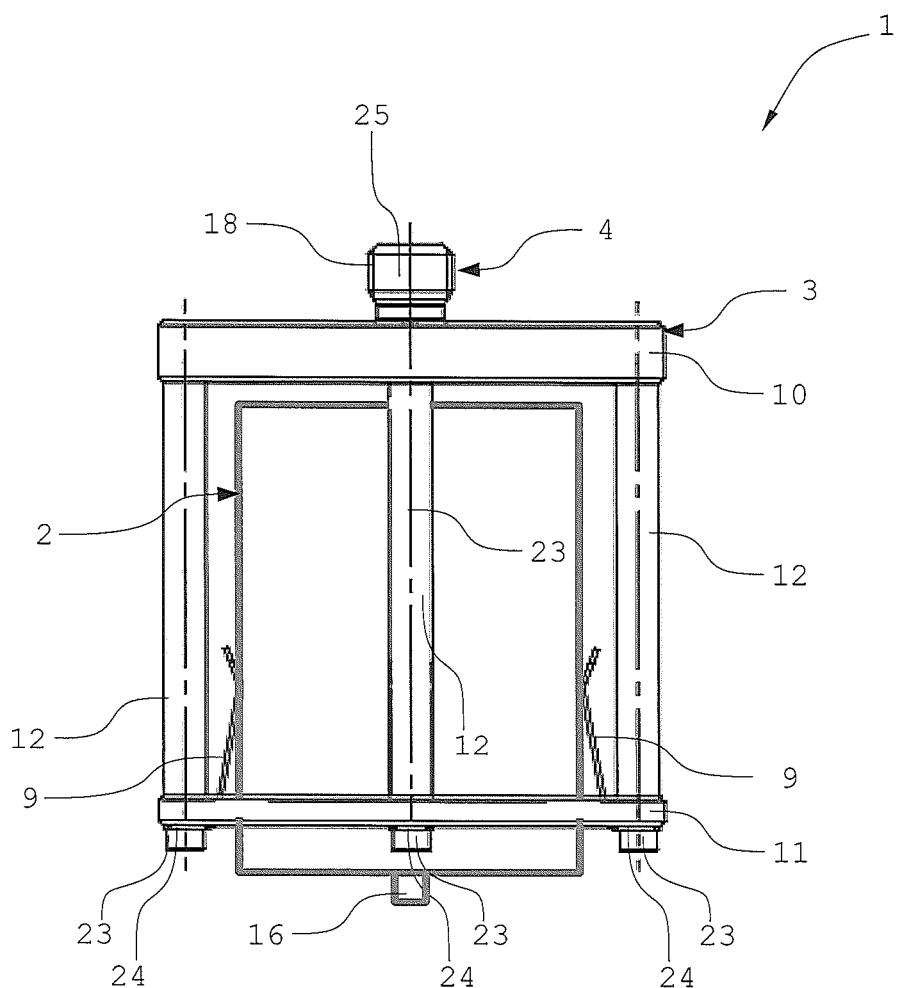
FIG. 1: is a side view of a holder.

FIG. 1 shows a holder 1. The holder 1 comprises a holding unit 3 with a cap realized as circular cover plate 10 and a bottom realized as ring 11. The cover plate 10 and ring 11 are connected by rods 12. The rods 12 are arranged circumferentially around circular cover plate 10 and ring 11. The holding unit 3 comprises a vertical axis 23, along which the rods 12 extend. Elongated spring elements 9 extend from the ring 11 and ends 24 of rods 12. The spring elements are fixated with screws 23 to the ends 24 of the rods 12. The spring elements 9 are arranged circumferentially around ring 11 and extend radially inwardly and vertically upwardly. The spring elements 9 hold a spray can 2. Since the spring elements 9 are arranged circumferentially around spray can 2 and each spring element 9 exerts a similar force on the spray can 2, the spray can 2 is centered in between the elongated spring elements 9. Additionally the spray can 2 is centered relatively to the ring 11 and circular cover plate 10. As a result, the vertical axis of the spray can 2 and the vertical axis of the holder are identical. The spray can 2 comprises a nozzle 16. The nozzle 16 of the spray can 2 is also centered relatively to vertical axis 23 and sprays downwardly along the vertical axis.

The holding unit 3 further includes a first mechanical interface 4. The first mechanical interface 4 includes a cylindrical portion 25 with a threading 18 and is centered relatively to vertical axis 23. A GNSS receiver 5 (see FIG. 3) is attached to the first interface 4.

Figures 2A, 2B:
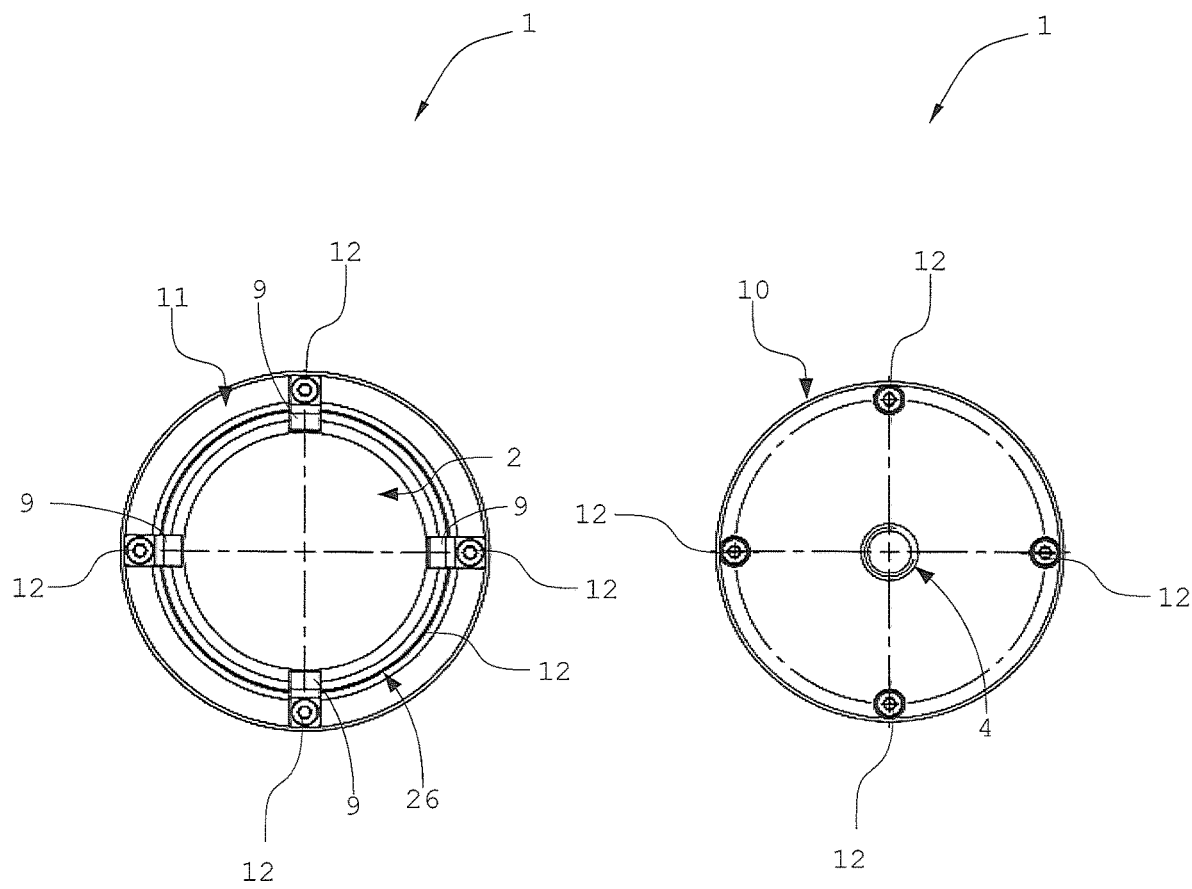
FIG. 2A: is a top view of the holder.
FIG. 2B: is a bottom view of the holder.

FIG. 2A shows a bottom view of holder 1. An inner opening 26 of ring 11 is larger than a circumference of the spray can 2. The spray can 2 be inserted through ring 11. The spring elements 9 center the spray can 2 relative to the ring 11. When an empty spray can 2 is removed from holder 1, the spray can 2 can be gripped and directly pulled along the vertical axis 23 of spray can 2 from the holding unit 3. Then, a new spray can be inserted by pushing the spray can 2 along its axis and the vertical axis 23 of holder 1 into the opening 26 of ring 11.

FIG. 2B shows a top view of holder 1. In the top view, the circular cover plate 10 and the connecting rods 12 are visible. The mechanical interface 4 is in the center of the cover plate 10. Thereby, a GNSS receiver 5 which is mounted on the first mechanical interface is centered relatively to holding unit 3.

Figure 3:
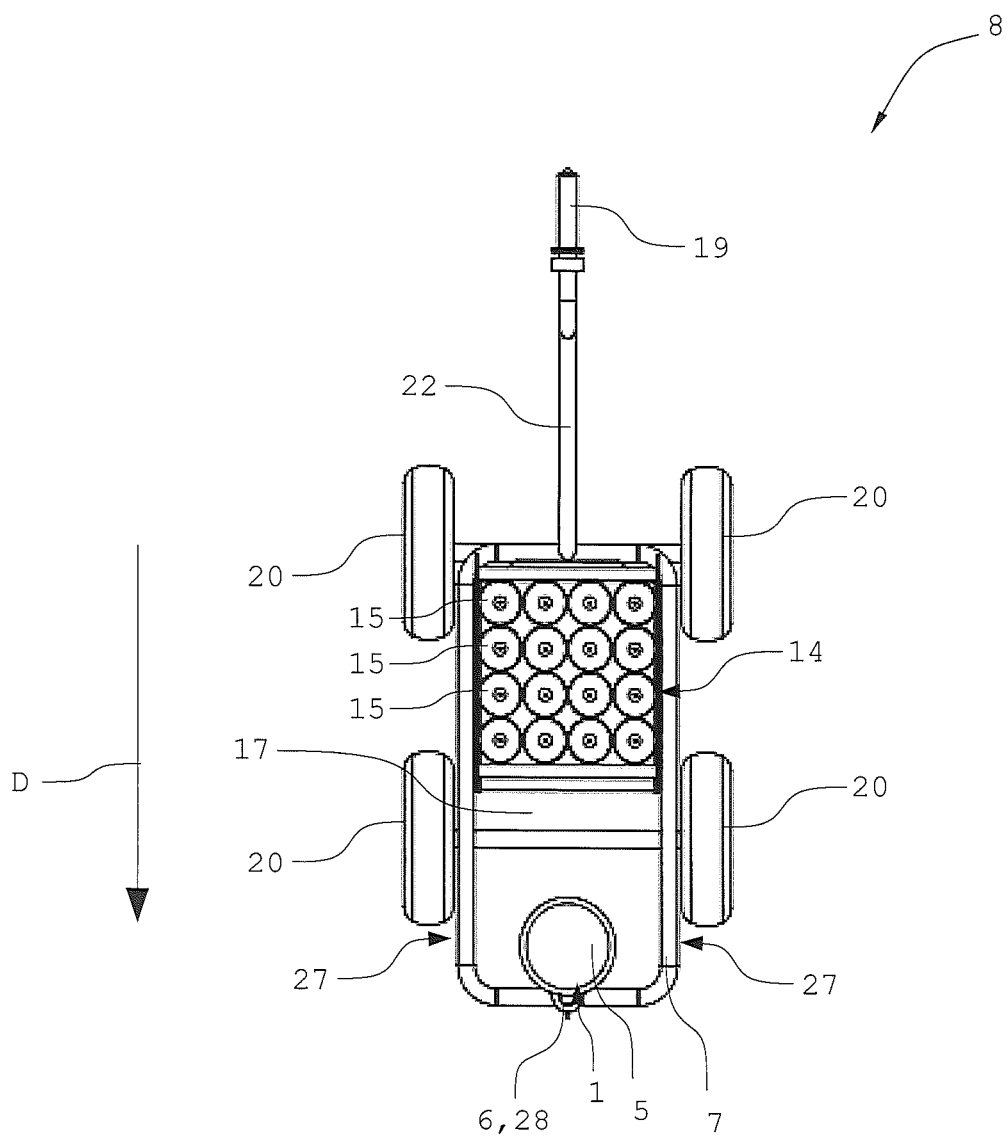
FIG. 3: is a top view of a surveying cart.

FIG. 3 shows a top view of a surveying cart 8 with the holder 1. The surveying cart 8 includes a frame 7. The cart 8 is carried by four wheels 20, which are mounted to sides 27 of frame 7. Further, the cart 8 comprises a first holder 1 as shown in FIGS. 1 to 2B and a second holder 14. The first holder 1 is attached to frame 7 with a second mechanical interface 6. The GNSS receiver 5 is mounted on the first interface 4 of the first holder 1.

The second mechanical interface comprises a rigid connector 28. The second holder 14 holds a plurality of additional spray cans 15. The spray cans 15 may be held in position with spring elements.

To push the cart, the cart includes a handle 19. Handle 19 is connected to the frame 7 of the cart by stick 22. Stick 22 may be mounted pivotable to the frame 2 such that the height of the handle can be adjusted to the height of the user. The cart 8 can be pushed along a direction of transport D by pushing the cart with the handle 19.

In between the first holder 1 and the second holder 14, a gap 17 is formed. The gap 17 allows a user to observe spray can 2 while pushing the cart 8 with handle 19. Thereby, a user can observe whether a surveyed spot was successfully marked.

Figures 4A, 4B:
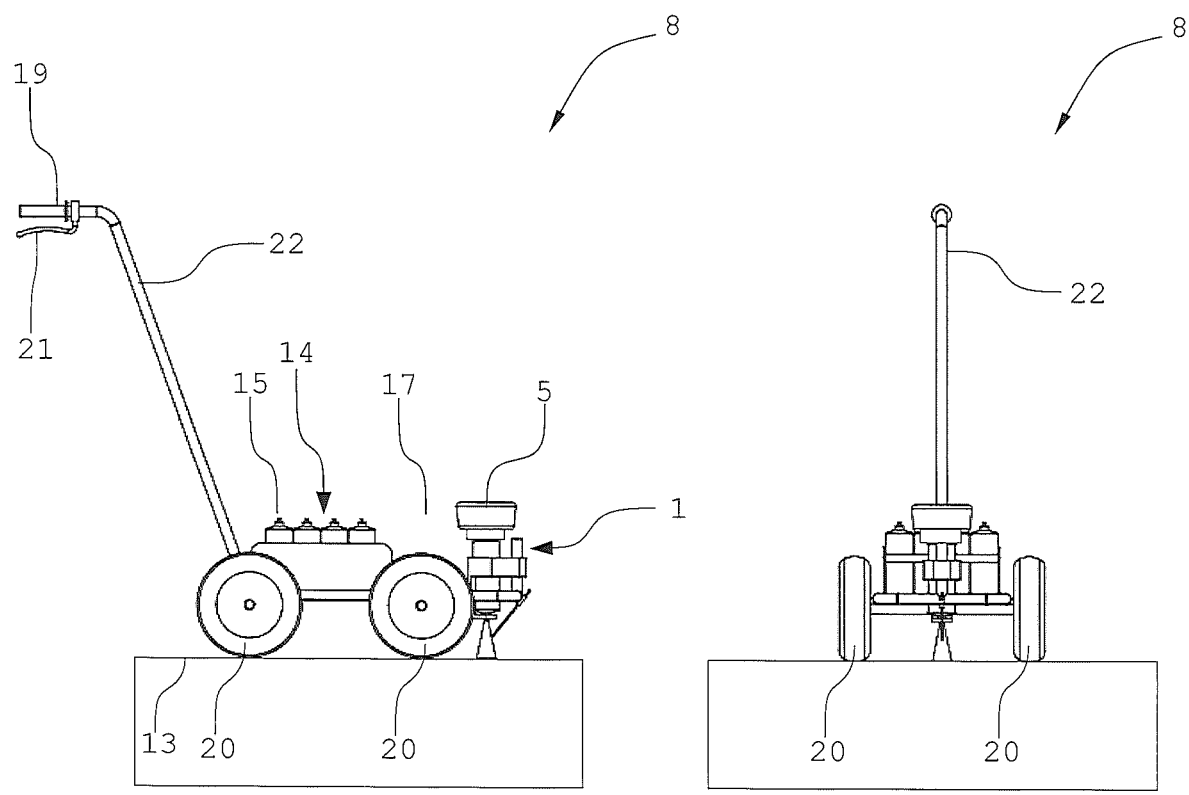
FIG. 4A: is a side view of the surveying cart.
FIG. 4B: is a front view of the surveying cart.

FIGS. 4A and 4B show a side view and a front of the surveying cart 8. Handle 19 additionally includes a pullable handle lever 21. With the lever 21 the spray nozzle of spray can 2 can be activated. Thus, once a user observes through the gap 17 that the cart has reached a predetermined location, the user can mark the spot by pulling lever 21. Additionally or alternatively, pulling the lever 21 could result in saving the current position and storing the GPS data of the current position by the GNSS receiver 5.

One possible application of the holder 1 mounted on the surveying cart 8 shown in FIGS. 1 to 4 is marking a football field.

Of course similar playing fields for American football, baseball, cricket or other fields may also be marked. Similar applications such as surveying and/or marking construction sites or parking lots are also possible.

When playing fields are surveyed, first the GNSS data of fixed locations is gathered. For example for a football field this data may be the holes for mounting corner flags and the holes for mounting the goals. The surveying cart 8 is pushed to a fixed location, e.g. to one of the holes. Once the GNSS receiver 5 is directly above the location a user saves the coordinates of the location. Once all fixed locations are stored, further points necessary for marking the field may be marked. The GNSS 5 sends the collected data wirelessly to a computing unit, such as a tablet or a smartphone. The computing unit receives and stores the collected data. In a next step a predetermined pattern, e.g. a football field, is applied to the collected points. In the process further reference points for marking the sports field are calculated. In a next step a display of the computing unit displays the surveyed fixed locations and the further calculated reference points as well as optionally directions to the calculated points.

Then steering information towards the reference points is displayed. The user pushes the cart to the calculated points and is informed by the display device, once a calculated point is reached. Then the user can mark the point on the ground 13 with spray can 2 via lever 21. After all points are marked, the survey procedure is complete and the sports field may be marked by connecting the marked points. For example conventional marking means such as strings and pegs may be used. Alternatively, the surveying cart can be used for marking.

The invention claimed is:

1. A surveying cart comprising:
   a frame,
   at least three wheels, which are attached to the frame,
   a first holder for fixing a cylindrical spray can, wherein the holder is releasably connected to the frame with a second mechanical interface,
   the holder comprising:
   a holding unit which defines an axis and secures the spray can, the holding unit comprising:
   a first mechanical interface for connecting a GNSS receiver or prism to the holding unit,
   wherein the holding unit is adapted to hold the spray can such that the first mechanical interface, the GNSS receiver or prism and the spray can are arranged coaxially with each other and the spray can is fixed below the GNSS receiver or prism such that a detected location is identical to a location marked with the spray can,
   wherein the holding unit comprises the second mechanical interface,
   wherein the holding unit comprises an upper cover plate and a lower ring which are coaxially aligned and define an interior of the holding unit therebetween, the lower ring having an opening through which the spray can is received into the interior of the holding unit, the spray can being retained within the interior of the holding unit by at least one spring element that is fixed to the lower ring.

2. The surveying cart according to claim 1, wherein two or more spring elements are arranged circumferentially around the spray can.

3. The surveying cart according to claim 1, wherein the holding unit comprises a cover plate, and a bottom ring, which are connected by rods, the rods being circumferentially arranged around holding unit such that the rods, the cover plate and the ring and define an interior of the holding unit, a plurality of springs being fixed to the holding unit such that such that the springs secure the spray can within the holding unit and coaxially with the GNSS receiver or prism.

4. The surveying cart according to claim 1, wherein the holder comprises a pointer for indicating a projection of a vertical axis of the GNSS receiver on the ground to a user.

5. The surveying cart according to claim 1, wherein the surveying cart further comprises
   a computing unit adapted to receive and store a detected location to an electronic storage and
   a data interface which is connectable to a data interface of a GNSS receiver or a prism.

6. The surveying cart according to claim 1, wherein the surveying cart further comprises a display device for displaying one or more or all of:
   a current position,
   stored positions,
   a predetermined pattern,
   steering information, and
   a location and/or direction error.

7. The surveying cart according to claim 1, wherein the holder is mounted as a pendulum to the cart.

8. The surveying cart according to claim 1, wherein the holder comprises a GNSS receiver or a prism attached to the first mechanical interface of the holding unit.

9. A set including a surveying cart according to claim 1 and a spray can, which is held by the holder wherein the holder is a first holder.

10. The set according to claim 9, wherein the spray can includes a nozzle and the nozzle is arranged such that the nozzle is observable by a user.

11. The set according to claim 10, wherein the spray can is arranged in front of a second holder and behind the first holder along an intended direction of movement and in between the first and the second holders a gap is formed such that the nozzle is observable by a user.

12. A method for surveying with the set according to claim 9, including the steps:
   Moving the cart to a location,
   Detecting a current location of a GNSS receiver or prism, and
   Saving the detected location to a storage.

13. A method for surveying with the surveying cart according to claim 1 including the steps:
   Moving the cart to a location
   Detecting a current location of a GNSS receiver or prism
   Saving the detected location to a storage.

14. The method for surveying according to claim 13 additionally including the step:
   Marking the current location with a spray can.

15. The method for surveying according to claim 13 additionally including the steps:
   Comparing the detected position with a predetermined location with a comparator,
   Calculating a location and/or direction error with the comparator, and
   Providing steering information including the location and/or direction error to an operator of the cart.

16. The method for surveying according to claim 15, wherein the steering information is provided with a display.

* * * * *